United States Patent [19]
Blew et al.

[11] Patent Number: 5,448,670
[45] Date of Patent: Sep. 5, 1995

[54] ELLIPTICAL AERIAL SELF-SUPPORTING FIBER OPTIC CABLE AND ASSOCIATED APPARATUS AND METHODS

[75] Inventors: Douglas J. Blew; Bruce J. Carlson; John C. Chamberlain; Jana Horska, all of Hickory, N.C.

[73] Assignee: CommScope, Inc., Catawba, N.C.

[21] Appl. No.: 258,333

[22] Filed: Jun. 10, 1994

[51] Int. Cl.⁶ ............................ G02B 6/44; H02G 3/00
[52] U.S. Cl. ................................ 385/112; 385/100; 385/109; 385/110; 385/113; 174/70 A
[58] Field of Search ............... 385/100, 102, 103, 104, 385/105, 106, 107, 110, 111, 112, 113; 174/70 A

[56] References Cited

U.S. PATENT DOCUMENTS

| | | | |
|---|---|---|---|
| 960,291 | 6/1910 | Engnér et al. | 174/41 X |
| 3,207,836 | 9/1965 | Slechta | 174/41 X |
| 3,267,201 | 8/1966 | Pusey et al. | 174/41 X |
| 3,297,814 | 1/1967 | McClean et al. | 174/41 X |
| 4,089,585 | 5/1978 | Slaughter et al. | 385/113 X |
| 4,143,942 | 3/1979 | Anderson | 385/113 X |
| 4,153,332 | 5/1979 | Longoni | 385/113 X |
| 4,181,815 | 1/1980 | Lundberg et al. | 174/115 X |
| 4,199,225 | 4/1980 | Slaughter et al. | 385/113 |
| 4,378,462 | 3/1983 | Arnold, Jr. et al. | 174/70 A |
| 4,570,477 | 2/1986 | Sugibuchi | 73/40.5 R |
| 4,763,983 | 8/1988 | Keith | 174/70 A |
| 4,822,133 | 4/1989 | Peacock | 385/113 X |
| 4,844,575 | 7/1989 | Kinard et al. | 385/113 X |
| 4,856,867 | 8/1989 | Gaylin | 174/41 X |
| 5,050,957 | 9/1991 | Hamilton et al. | 385/113 |
| 5,095,176 | 3/1992 | Harbrecht et al. | 174/23 R |
| 5,123,075 | 6/1992 | Renton | 385/101 |
| 5,125,063 | 6/1992 | Panuska et al. | 385/113 |
| 5,138,685 | 8/1992 | Arroyo et al. | 385/113 |
| 5,165,003 | 11/1992 | Carter | 385/112 |
| 5,283,014 | 2/1994 | Oestreich et al. | 264/1.5 |

OTHER PUBLICATIONS

*Testing of Fittings and Aerial Fiber Optic Cables,* Sunkle et al., presented at the 1991 Distribution 2000 Conference Insulated Line and Cable Systems, Sydney, Australia, May 1991, pp. 1–16.
*Cable Motions and Their Control,* Sunkle et al., presented at the 1989 Power Distribution Conference, Austin, Tex., Oct. 1989, pp. 1–10.

Primary Examiner—Brian Healy
Attorney, Agent, or Firm—Bell, Seltzer, Park & Gibson

[57] ABSTRACT

An aerial self-supporting fiber optic cable includes a pair of longitudinal strength members extending along respective opposite sides of a core, and a jacket surrounding the core and strength members, wherein the jacket has a generally elliptical outer cross-sectional shape. A major transverse axis of the generally elliptical jacket is generally aligned with an imaginary line defined between the pair of longitudinal strength members. The cable core includes at least one elongate buffer tube and at least one optical fiber disposed within the buffer tube. The strength members has a predetermined tensile strength to support the fiber optic cable between adjacent vertical supports. The jacket may have a generally elliptical shape with an enlarged central lobe surrounding the core, and a pair of relatively smaller lobes on opposite sides of the central lobe and surrounding respective longitudinal strength members. An armor layer surrounds the core and provides protection for below ground installation of the cable as well. The fiber optic cable is also preferably flexible to facilitate twisting thereof between adjacent vertical supports to define a more irregular shape for wind passing over the fiber optic cable to thereby reduce wind-induced motion of the cable. An apparatus and method for making the cable are also disclosed.

37 Claims, 3 Drawing Sheets

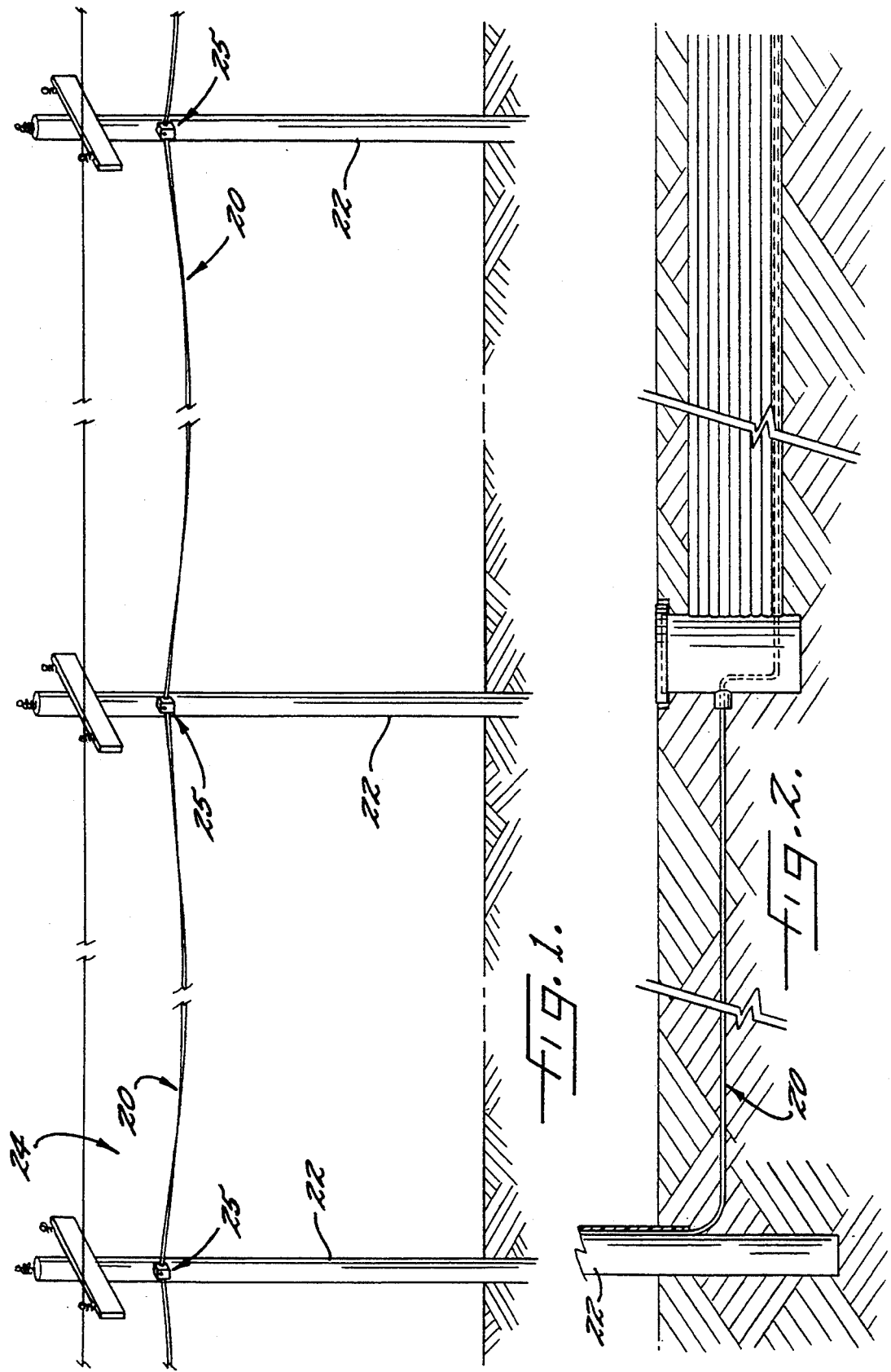

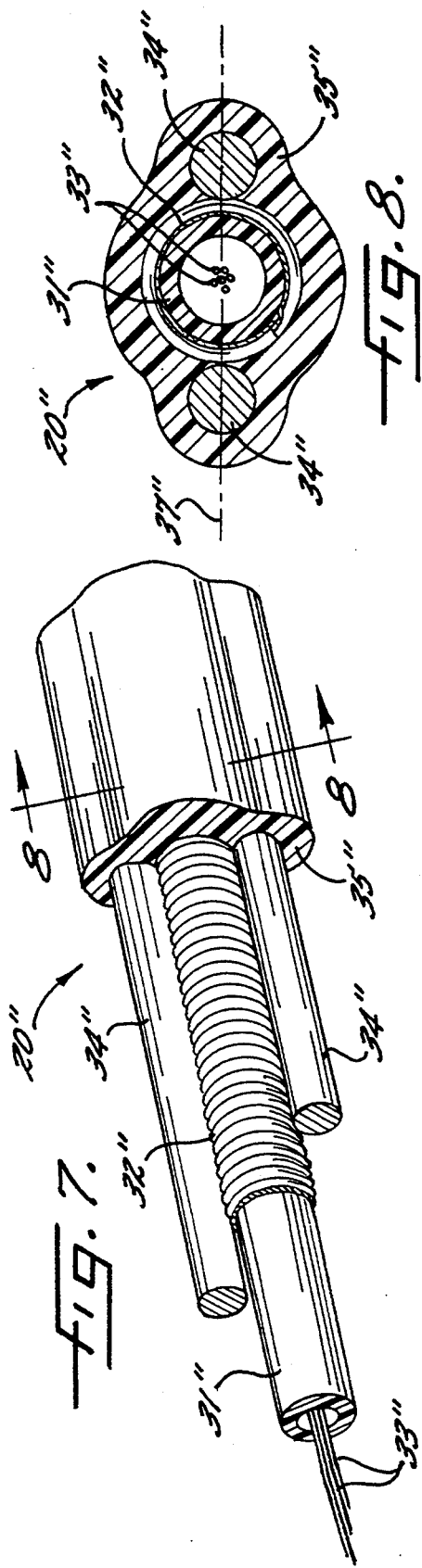
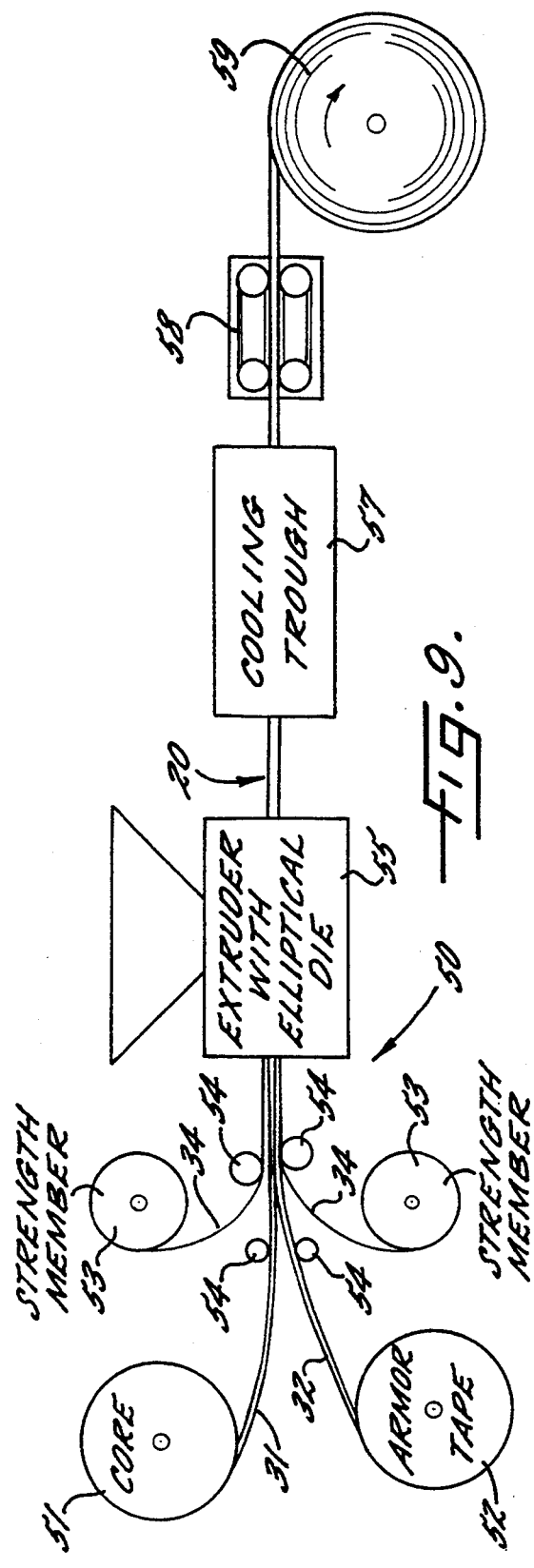

ELLIPTICAL AERIAL SELF-SUPPORTING FIBER OPTIC CABLE AND ASSOCIATED APPARATUS AND METHODS

FIELD OF THE INVENTION

The invention relates to the field of communication cables, and, more particularly, to an aerial self-supporting fiber optic cable and an apparatus and method for making same.

BACKGROUND OF THE INVENTION

Communication cables employing optical fibers are widely used in the telecommunications industry. In particular, multifiber cables are widely used for long distance telephone communications, interexchange telephone applications, and other telephony and data transmission applications. Fiber optic cables are also being incorporated into cable television networks in place of more traditional coaxial cables. Optical fibers may permit long distances between signal repeaters or eliminate the need for such repeaters altogether. In addition, optical fibers offer extremely wide bandwidths and low noise operation.

A fiber optic cable typically includes a core and an outer protective jacket. A plurality of optical fibers are contained within the core. For a typical fiber optic cable, such as used for long distance communications, the fibers are maintained in a loose-buffered relationship within one or more buffer tubes which define the core and thereby isolate the fibers from strain imparted to the cable. A typical loose-buffered cable, such as available from Siecor of Hickory, N.C. under the designation MINIBUNDLE TM, includes a series of plastic buffer tubes stranded around a central support member in a concentric layer.

Another type of loose-buffered fiber optic cable is offered by AT&T under the designation LIGHTPACK LXE ®. The AT&T cable includes a relatively large single central buffer tube which contains the plurality of optical fibers, as shown in U.S. Pat. No. 4,844,575 to Kinard et al. One or more longitudinal strength members, such as opposed wires, may be positioned within the overall plastic jacket. See also U.S. Pat. No. 5,138,685 Arroyo et al. and U.S. Pat. No. 5,165,003 to Carter which both disclose conventional central buffer tube fiber optic cables.

Similarly, U.S. Pat. No. 5,125,063 to Panuska et al. discloses a lightweight fiber optic cable having a single central buffer tube and a pair of diametrically opposed strength members. Because of the extended strain window of the cable, wire or glass rods may be used as the strength members, and the typical armor layer may be deleted, especially for aerial installations where a lighter weight is desirable. The cable meets the 600 lb. tension limit as standard for typical fiber optic cables. The strength members of a conventional fiber optic cable typically permit about 600 lbs. of pulling tension during cable installation. However, typically once aerially installed, the strength members are no longer needed since the messenger carries the weight of the installed cable.

A conventional fiber optic cable may be installed along its designated route by directly burying the cable in the soil, by placing the cable within a duct line, or by aerially installing the cable along a series of vertical supports. A combination of such installation techniques may also be employed for a given fiber optic communications system. A fiber optic cable is typically aerially installed along a utility wood pole line, for example, by lashing the cable with a helically wound small gauge solid wire to a preinstalled supporting messenger. The messenger is typically a stranded metallic cable secured by respective clamps at each of a series of wood poles or other vertical supports. The cable is pulled into position adjacent the messenger and the lashing wire is helically wrapped around the cable and messenger. Accordingly, the messenger serves to support the weight of the installed cable.

The sag and tension experienced by a conventional aerially installed fiber optic cable and its supporting messenger are most severe during wind and ice loading conditions when a build-up of ice surrounding the messenger and cable presents a large weight increase. Moreover, wind further increases the loading on the cable because the ice also presents a larger surface area. For a typical aerial installation of a fiber optic cable along a utility wood pole line, the cable is typically installed in the so-called "communications space" on the pole which is below and spaced from high voltage power lines for safety reasons. Accordingly, the amount of sag that may be accommodated is limited to also provide adequate clearance in the area underneath the fiber optic cable.

Fiber optic cables of the self-supporting type are also known, which, by definition requires no separate supporting messenger. For example, a figure-8 self-supporting aerial fiber optic cable is known, as disclosed, for example, in U.S. Pat. No. 5,095,176 to Harbrecht et al. The cable includes a first jacket portion in which a support strand is enclosed, and a second portion containing transmission media which may be optical fibers. Similarly, U.S. Pat. No. 4,763,983 to Keith discloses an all-dielectric, figure-8 fiber optic cable having a glass reinforced plastic rod serving as the integral supporting messenger. As typically installed, the integral supporting messenger is uppermost, while the fiber containing portion of the cable is carried underneath the integral messenger.

Self-supporting aerial cables of the figure-8 configuration are also known for electrical power cables as disclosed, for example, in U.S. Pat. No. 960,291 to Egner et al.; U.S. Pat. No. 3,207,836 to Slechta; U.S. Pat. No. 3,267,201 to Pusey et al.; and U.S. Pat. No. 3,297,814 to McClean et al. Similarly, U.S. Pat. No. 4,378,462 to Arnold, Jr. et al. discloses a figure-8 self-supporting copper wire pair telecommunications cable.

Unfortunately, a figure-8 fiber optic cable may be relatively stiff and difficult to handle, especially during installation. Moreover, because the single strength imparting member, that is, the integral messenger is positioned on one side of the fiber containing portion, the overall cable may have a pronounced asymmetrical and preferred bending direction. This makes handling of the cable even more difficult. Such figure-8 cables are typically only suitable for aerial installation. More particularly, the figure-8 cable could not be universally used for direct burial and duct sections of a typical fiber optic cable system.

Another type of aerial self-supporting fiber optic cable includes a layer of aramid yarn surrounding a circular fiber containing core. Unfortunately, the layer of aramid yarn for a self-supporting configuration is relatively expensive. Moreover, because the cable is relatively lightweight and presents a smooth symmetrical surface to wind, such a cable may be subject to wind-induced motion damage. The aramid yarn fiber optic cable is also typically not suitable for direct burial installation or installation within a duct line primarily because of its expense and lack of rodent protection.

SUMMARY OF THE INVENTION

In view of the foregoing background, it is therefore an object of the present invention to provide a fiber optic cable that may be easily handled and installed in an aerial self-supporting configuration and that may also be used in below ground level installations.

It is another object of the invention to provide an aerial-self-supporting fiber optic cable that is resistant to wind-induced motion.

It is another object of the invention to provide an apparatus and method for making the self-supporting fiber optic cable according to the invention.

These and other objects, features and advantages of the present invention are provided by a self-supporting fiber optic cable including a pair of longitudinal strength members extending along respective opposite sides of a core, and a jacket surrounding the core and strength members, wherein the jacket has a generally elliptical outer cross-sectional shape. The elliptical shape accommodates the relatively large strength members. A major transverse axis of the generally elliptical jacket is aligned with an imaginary line defined between the pair of longitudinal strength members. The cable core includes at least one elongate buffer tube and at least one optical fiber disposed within the buffer tube. The self-supporting aerial fiber optic cable is adapted to be aerially installed along a series of spaced apart vertical supports to extend between adjacent vertical supports in a generally horizontal orientation. Accordingly, the strength members have a predetermined tensile strength to support the fiber optic cable between adjacent vertical supports.

The cable of the invention may be installed in a self-supported configuration, thereby avoiding the cost of labor and materials for a separate supporting messenger. The self-supporting fiber optic cable may also readily meet sag and tension requirements for a predetermined span length. For example, a 300 foot span of fiber optic cable may desirably sag typically only between about 0.5% to 1.5% over the span length.

The fiber optic cable may also preferably include an armor tape layer surrounding the core and underlying the cable jacket to provide additional protection for the core. Accordingly, the fiber optic cable may also be readily installed below ground level, such as by direct burial or by positioning in a conduit. The armor layer provides additional protection particularly against rodent damage. Because the cable is more easily handled as compared to a figure-8 cable, for example, the fiber optic cable of the invention may have a portion installed in the aerial self-supporting configuration and a portion installed below ground. Stated in other words, the fiber optic cable according to the invention may be considered as a universal cable for many fiber optic communication systems.

Each of the strength members may be a solid metallic wire, a stranded metallic wire, or a rod of reinforced dielectric material. For a steel wire having a circular cross-section shape, the diameter is preferably in a range of about 1.7 to 3 mm. In one embodiment of the self-supporting cable, the buffer tube, the pair of strength members, and the jacket are plastic so that the fiber optic cable is an all-dielectric cable.

The generally elliptical shape may be more resistant to wind-induced motion than a circular cable. The jacket may have a generally elliptical shape with an enlarged central lobe surrounding the core, and a pair of relatively smaller lobes on opposite sides of the central lobe and surrounding respective relatively large longitudinal strength members. Accordingly, this embodiment of the cable has a trilobal shape for the jacket.

A single central buffer tube may form the core, or, alternatively, a plurality of buffer tubes may be stranded around a central support member. The fiber optic cable is preferably flexible to facilitate twisting thereof between adjacent vertical supports to define a more irregular shape for wind passing over the fiber optic cable to thereby reduce wind-induced motion of the cable.

A method according to the invention is for making the self-supporting fiber optic cable adapted to be aerially installed to a series of spaced apart vertical supports and extend between adjacent vertical supports in a generally horizontal orientation. The method includes the steps of: providing a core comprising at least one elongate buffer tube and at least one optical fiber disposed within the at least one buffer tube; positioning a pair of longitudinal strength members extending along respective opposite sides of the core; and forming a plastic jacket surrounding the core and the strength members so that the plastic jacket has a generally elliptical outer cross-sectional shape with a major transverse axis thereof generally aligned with an imaginary line defined between the pair of longitudinal strength members.

The step of forming the generally elliptical jacket may preferably include forming the jacket to have an enlarged central lobe surrounding the core, and a pair of relatively smaller lobes on opposite sides of the central lobe and surrounding respective longitudinal strength members to thereby define a trilobal shape for the jacket. The generally elliptical outer shape of the jacket may be formed by passing the core and strength members through an extrusion die having a generally elliptical shape.

An apparatus for making the self-supporting fiber optic cable includes feeder means for advancing a fiber optic cable core along a predetermined path, the fiber optic cable core comprising at least one elongate buffer tube and at least one optical fiber disposed within the at least one buffer tube. The apparatus also includes means for positioning a pair of longitudinal strength members extending along respective opposite sides of the advancing fiber optic cable core. Extruder means is positioned along the predetermined path of travel for forming a plastic jacket surrounding the core and the strength members so that the plastic jacket has a generally elliptical outer cross-sectional shape with a major transverse axis thereof generally aligned with an imaginary line defined between the pair of longitudinal strength members.

The extruder means preferably includes a generally elliptical die. In one embodiment, the generally elliptical die forms the jacket to have a generally elliptical shape with an enlarged central lobe surrounding the core, and a pair of relatively smaller lobes on opposite sides of the central lobe and surrounding respective longitudinal strength members to thereby define a trilobal shape for the jacket. Cooling means may be positioned downstream from the extruder means for further cooling and solidifying the extruded plastic jacket. In addition, an armor tape supply is preferably provided upstream from the extruder to surround the core with an armor tape layer for additional core protection.

Another method aspect of the present invention is for making a fiber optic communications system including a length of self-supporting fiber optic cable aerially installed along a series of spaced apart vertical supports to extend between adjacent vertical supports in a generally horizontal orientation. The fiber optic cable is preferably of the type described above and includes a core comprising at least one elongate buffer tube and at least one optical fiber disposed within the at least one buffer tube; a pair of longitudinal strength members extending along respective opposite sides of the core, the strength members having a predetermined tensile strength to support the fiber optic cable between adjacent vertical supports; and a jacket surrounding the core and the strength members. The jacket preferably has a generally elliptical outer cross-sectional shape with a major transverse axis thereof generally aligned with an imaginary line defined between the pair of longitudinal strength members. The method preferably includes the steps of: advancing the generally elliptically-shaped self-supporting fiber optic cable through a series of clamps carried by respective vertical supports; twisting the generally elliptically-shaped self-supporting fiber optic cable between adjacent vertical supports; and securing the cable clamps to maintain the twists in the cable to define a more irregular shape for wind passing over the fiber optic cable to thereby reduce wind-induced movement or motion.

BRIEF DESCRIPTION OF THE DRAWINGS

FIG. 1 is a schematic view of an aerial portion of a fiber optic communications system illustrating the fiber optic cable according to the invention installed aerially in a self-supporting configuration along a series of wood utility poles.

FIG. 2 is a schematic view of an adjacent portion of the fiber optic communications system shown in FIG. 1 illustrating the fiber optic cable according to the present invention installed below ground.

FIG. 7 is a perspective fragmentary view of yet another embodiment of a self-supporting fiber optic cable according to the invention.

FIG. 8 is a cross-sectional view of the self-supporting cable as taken along lines 8—8 of FIG. 7.

FIG. 9 is a schematic diagram of an apparatus for making the self-supporting fiber optic cable according to the invention.

DETAILED DESCRIPTION OF THE PREFERRED EMBODIMENTS

Figure 3:
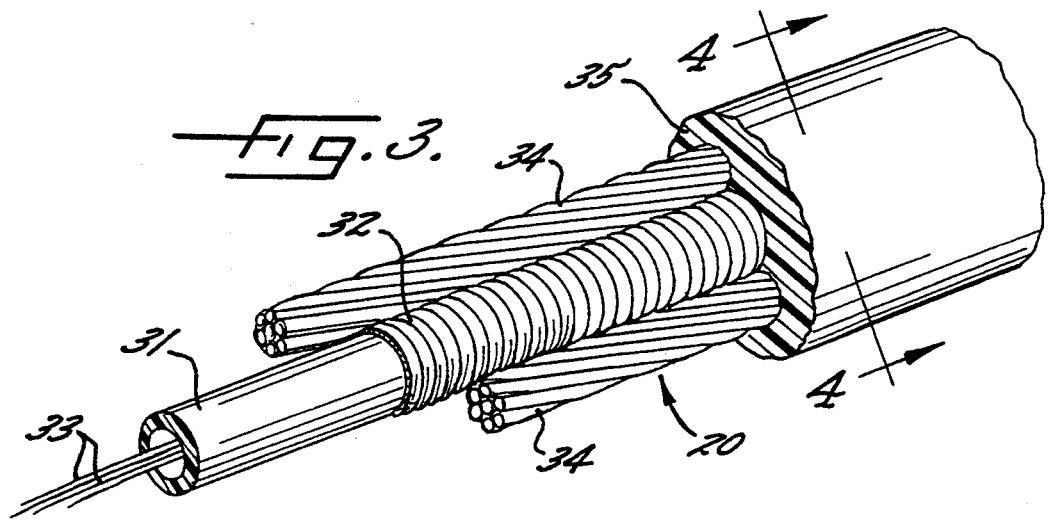
FIG. 3 is a perspective fragmentary view of an embodiment of a self-supporting fiber optic cable according to the invention.
Figure 4:
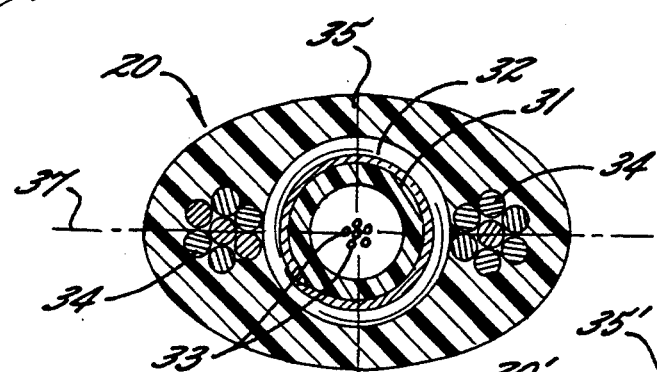
FIG. 4 is a cross-sectional view of the self-supporting cable as taken along lines 4—4 of FIG. 3.

The present invention will now be described more fully hereinafter with reference to the accompanying drawings, in which preferred embodiments of the invention are shown. This invention may, however, be embodied in many different forms and should not be construed as limited to the embodiment set forth herein; rather, these embodiment are provided so that this disclosure will be thorough and complete, and will fully convey the scope of the invention to those skilled in the art. Like numbers refer to like elements throughout. Prime and double prime notations are used to indicate similar elements in alternate embodiments of the invention.

Referring first to FIGS. 1-4, a first embodiment of a self-supporting fiber optic cable 20 according to the invention is described. The fiber optic cable 20 is aerially installed along a series of vertical supports, such as the illustrated wood utility poles 22 (FIG. 1). The fiber optic cable 20 may be part of a fiber optic communications system 24 which would also include termination electronics, not shown, such as for telephony or cable TV applications.

The cable 20 is secured to each pole by a suitable clamp 25 as schematically illustrated in FIG. 1. As would be readily understood by those skilled in the art, the clamp 25 may be plastic and include two halves which together define a passageway to receive the cable 20. The passageway may preferably have a predetermined shape to correspond to the shape of the fiber optic cable 20 as described in greater detail below. A through bolt may be used to secure the clamp 25 together and to attach the clamp to the wood pole 22. As would also be readily understood by those skilled in the art the clamp may also be of the type including clamping grips, not shown, secured to the cable to further distribute the gripping force along a greater length of the cable at the clamping point.

The fiber optic cable 20 includes a core, which in the illustrated embodiment includes a single central buffer tube 31, and a surrounding layer of corrugated metal armor tape 32. The metal armor tape 32 provides a rodent resistant armor for the cable. Accordingly, as shown in FIG. 2 the same fiber optic cable 20 may be installed below ground in a direct burial installation, or routed through a manhole 28 and into a pre-existing conduit 29 within a bank of conduits. As illustrated, the transition from aerial to below ground is accomplished at the pole 22 of FIG. 2, and wherein the cable 20 is protected along the pole by a U-shaped shield 27 as would be readily understood by those skilled in the art. The below ground installation is facilitated by the ease of handling afforded by the fiber optic cable 20 according to the invention and in sharp contrast to conventional figure-8 self-supporting cables.

One or more optical fibers 33 are contained within the buffer tube 31 in loose-buffered relationship as would be readily understood by those skilled in the art. As would also be appreciated by those skilled in the art, the buffer tube 31 may also contain a grease filling, not shown, to prevent water migration along the cable.

The self-supporting fiber optic cable 20 also includes a pair of diametrically opposed strength members 34 extending lengthwise adjacent the core. In the illustrated embodiment, each of the strength members 34 is a stranded steel wire. Each of the strength members 34 has a predetermined tensile strength to support fiber optic cable 20 between adjacent vertical supports 22, while meeting desired sag and tension requirements.

An overall plastic jacket 35 surrounds the core and the strength members 34. The jacket 35 may preferably be formed of a thermoplastic polymer, such as polyethylene, as would be readily appreciated by those skilled in the art. Moreover, the illustrated jacket 35 has a generally elliptical outer cross-sectional shape with a major transverse axis 37 generally aligned with an imaginary line defined between the pair of longitudinal strength members 34. The placement of the strength members 34 on opposite sides, as well as the elliptical shape of the jacket 35 allows the cable 20 to have a relatively high degree of flexibility so that the cable may be more easily handled, especially during installation. The fiber optic cable 20 is preferably flexible to facilitate twisting thereof between adjacent vertical supports 22 (FIG. 1) to define a more irregular shape for wind passing over the fiber optic cable to thereby reduce wind-induced movement thereof.

In addition, the placement of the strength members 34 adjacent the core and surrounded by the plastic jacket 35 may greatly enhance the service life of the cable, since the supporting strength members 34 are surrounded by a substantial portion of the plastic jacket 35, in contrast to a conventional figure-8 cable which includes only a relatively thin web of plastic material joining the integral supporting messenger to the fiber containing portion of the cable.

The elliptical shape of the jacket 35 accommodates the relatively large strength members 34 required to make the cable self-supporting. In contrast to a circular cable, for example, the elliptical cable 20 according to the invention requires less plastic and, hence, is lighter than a circular cable.

A feature of the elliptical self-supporting cable 20 according to the invention is that the cable may be rotationally twisted between vertical supports 22 (FIG. 1). Accordingly, the twisted elliptical cable 20 breaks up a pattern of laminar air flow that would otherwise result. For a typical installation, the fiber optic cable 20 has a predetermined number of rotational twists between adjacent vertical supports to define an irregular shape for wind passing thereover to thereby reduce undesirable wind-induced motion of the self-supporting fiber optic cable 20. For example, the fiber optic cable 20 may preferably be twisted in a range of from 1 to 25 times for each 100 feet of span length.

The twisted elliptical cable 20 is thus more resistant to wind-induced cable motion, such as aeolian vibration and the more severe cable galloping. See, for example, *Cable Motions and Their Control*, by Sunkle et al. of Preformed Line Products Company, presented at the 1989 Power Distribution Conference at the University of Texas, Austin, Tex., Oct. 25, 1989, the entire disclosure of which is incorporated herein by reference. The twisted elliptical self-supporting cable 20 according to the invention is also less likely to require dampers to suppress vibration. Such dampers are disclosed in *Testing of Fittings and Aerial Fiber Optic Cables*, by Sunkle et al. of Preformed Line Products Company, and presented at the 1991 Distribution 2000 Conference Insulated Line and Cable Systems, Sydney, Australia, May 29–31, 1991, the entire disclosure of which is incorporated herein by reference.

Figure 5:
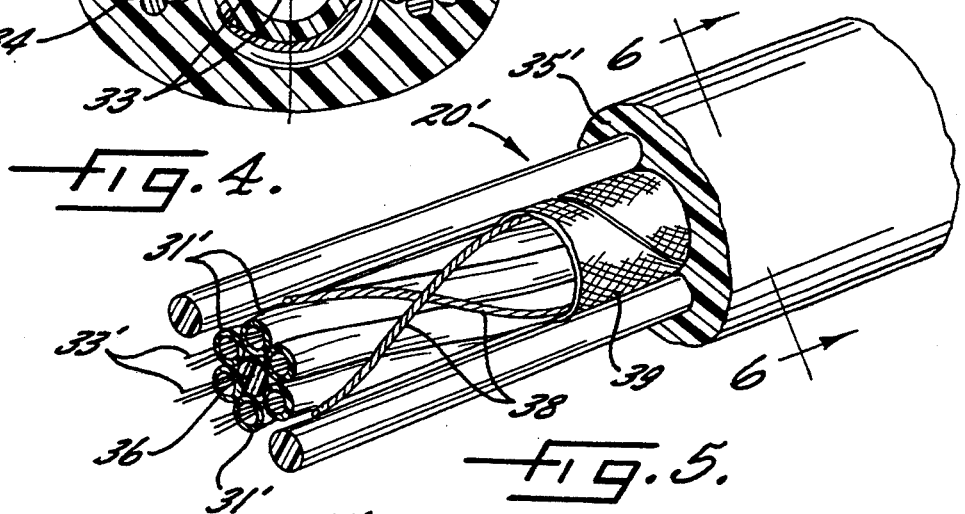
FIG. 5 is a perspective fragmentary view of another embodiment of a self-supporting fiber optic cable according to the invention.
Figure 6:
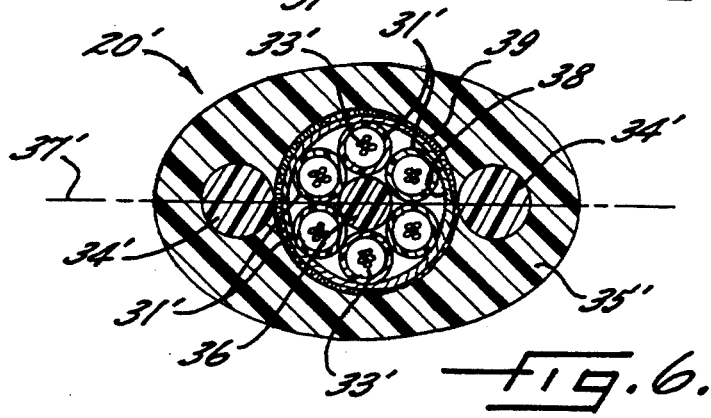
FIG. 6 is a cross-sectional view of the self-supporting cable as taken along lines 6—6 of FIG. 5.

Referring now additionally to FIGS. 5 and 6, another embodiment of the self-supporting fiber optic cable 20' according to the invention is described. The cable 20' is an all-dielectric embodiment that may be desirable to avoid induced voltages on metallic components as may be caused by adjacent power lines. The self-supporting cable 20' includes a core formed of a plurality of buffer tubes 31' surrounding a central support member 36. Each of the buffer tubes 31' includes one or more optical fibers 33'. A yarn 38 secures the buffer tubes 31' in the desired helical or reversing helical lay pattern around the central support member 36 as would be readily understood by those skilled in the art. A textile tape 39 may also be secured around the cable core.

The pair of opposing strength members 34' may be formed of various reinforced dielectric materials as would be readily appreciated by those skilled in the art. The overall protective plastic jacket 35' is also elliptical in outer cross-sectional shape with the attendant features and advantages as described above with respect to the first embodiment of the invention. The elliptical jacket 35' has a major transverse axis 37' aligned with the pair of strength members 34'. The all-dielectric embodiment of the fiber optic cable 20' does not include a metallic armor tape; however, if an all-dielectric cable is not necessary, an armor layer may be used in conjunction with the stranded buffer tubes 31' and dielectric strength members 34'.

Referring now to FIGS. 7 and 8, a third embodiment of a self-supporting fiber optic cable 20" according to the present invention is described. The cable 20" includes a core having a single central buffer tube 31". A corrugated metallic armor layer 32" surrounds the core. The pair of opposing strength members 34" are aligned with major axis 37" and are provided in this embodiment by respective high strength steel solid wires. For a typical self-supporting fiber optic cable 20" according to the invention, each of the solid metallic wires 34" is preferably a steel wire having a circular cross-sectional shape with a diameter in a range of about 1.7 to 3 mm.

The illustrated protective jacket 35" has a generally elliptical shape with an enlarged central lobe surrounding the core, and a pair of relatively smaller lobes on opposite sides of central lobe and surrounding respective longitudinal strength members 34" to thereby define a trilobal shape for the jacket. The trilobal jacket 35" may also reduce the amount of plastic needed for the overall jacket. In addition, the trilobal shape provides an irregular surface to further reduce wind-induced motion, even if installed without any rotational twists between adjacent vertical supports 22 (FIG. 1). The other components of the cable 20" are as described above with similar reference numerals, and hence need no further description.

Referring now to FIG. 9, an apparatus 50 and method according to the invention for making the self-supporting fiber optic cable 20 are described. The self-supporting fiber optic cable 20 is adapted to be aerially installed to a series of spaced apart vertical supports 22 (FIG. 1) and extend between adjacent vertical supports in a generally horizontal orientation as described above. The apparatus 50 includes a supply 51 of fiber optic cable core which in the illustrated embodiment includes a single central buffer tube 31 containing one or more optical fibers. The apparatus 50 also includes a supply of corrugated armor tape 32, and supplies 53 for the pair of oppositely positioned strength members 34. One or more rolls 54 or other guides direct the advancement of the cable components as would be readily understood by those skilled in the art.

The core, armor layer and strength members pass through an extruder 55 which has a generally elliptical die for forming the desired outer shape of the self-supporting fiber optic cable 20. Generally elliptical is understood to also include the trilobal shape described above. Downstream from the extruder 55 a water cooling trough 57 further cools and solidifies the cable jacket. Take-up means 58 provided by a pair of traction belts feeds the cable onto a take-up reel 59, as illustrated.

The method for making the self-supporting fiber optic cable 20 includes the steps of: providing a core comprising at least one elongate buffer tube 31 and at least one optical fiber 33 disposed within the at least one buffer tube; positioning a pair of longitudinal strength members 34 extending along respective opposite sides of the core; and forming a plastic jacket 35 surrounding the core and the strength members so that the plastic jacket has a generally elliptical outer cross-sectional shape with a major transverse axis thereof generally aligned with an imaginary line defined between the pair of longitudinal strength members. An armor layer 32 may also be formed surrounding the core and underlying the jacket.

The step of forming the generally elliptical jacket in one embodiment may preferably include forming the jacket 35" (FIGS. 7 and 8) to have an enlarged central lobe surrounding the core, and a pair of relatively smaller lobes on opposite sides of the central lobe and surrounding respective longitudinal strength members 34" to thereby define a trilobal shape for the jacket. The generally elliptical outer shape of the jacket may be formed by passing the core and strength members through an extruder 55 having an extrusion die with a generally elliptical shape.

Another method aspect of the present invention is for making a fiber optic communications system including a length of self-supporting fiber optic cable 20 aerially installed along a series of spaced apart vertical supports 22 to extend between adjacent vertical supports in a generally horizontal orientation. The fiber optic cable 20 is preferably of the type described above and includes a core comprising at least one elongate buffer tube 31 and at least one optical fiber 33 disposed within the at least one buffer tube; a pair of longitudinal strength members 34 extending along respective opposite sides of the core, each of the strength members having a predetermined tensile strength to support the fiber optic cable between adjacent vertical supports; and a jacket 35 surrounding the core and the strength members. The jacket 35 preferably has a generally elliptical outer cross-sectional shape with a major transverse axis 37 thereof generally aligned with an imaginary line defined between the pair of longitudinal strength members. The method comprises the steps of: advancing the generally elliptically-shaped self-supporting fiber optic cable through a series of clamps 25 carried by respective vertical supports 22; twisting the generally elliptically-shaped self-supporting fiber optic cable 20 between adjacent vertical supports and securing the clamps to thereby define a more irregular shape for wind passing over the fiber optic cable to thereby reduce wind-induced vibration thereof. In addition, the fiber optic cable embodiment including the armor layer may also be readily positioned in a below ground installation, such as by direct burial or by placement in a conduit.

Many modifications and other embodiments of the self-supporting fiber optic cable according to the invention will come to the mind of one skilled in the art having the benefit of the teachings presented in the foregoing descriptions and the associated drawings. For example, yet another embodiment of the fiber optic cable may include stranded buffer tubes in an all-dielectric cable having a trilobal outer shape. Therefore, it is to be understood that the invention is not to be limited to the specific embodiments disclosed, and that modifications and embodiments are intended to be included within the scope of the appended claims.

That which is claimed:

1. A fiber optic cable adapted to be aerially installed in a self-supporting configuration extending generally horizontally along a series of spaced apart vertical supports, said fiber optic cable comprising:
   a core comprising at least one elongate buffer tube and at least one optical fiber disposed within said at least one buffer tube;
   a pair of longitudinal strength members extending along respective opposite sides of said core, said strength members having a predetermined tensile strength for supporting said fiber optic cable between adjacent vertical supports;
   a jacket surrounding said core and said strength members, said jacket having a generally elliptical outer cross-sectional shape with a major transverse axis thereof generally aligned with an imaginary line defined between said pair of longitudinal strength members; and
   wherein said fiber optic cable is flexible to facilitate twisting thereof between adjacent vertical supports to define a more irregular shape for wind passing over said fiber optic cable to thereby reduce wind-induced motion thereof.

2. A fiber optic cable according to claim 1 wherein each of said pair of strength members is a solid metallic wire.

3. A fiber optic cable according to claim 2 wherein each of said solid metallic wires is a steel wire having a circular cross-section shape with a diameter in a range of about 1.7 to 3 mm.

4. A fiber optic cable according to claim 1 wherein each of said pair of strength members is a stranded metallic wire.

5. A fiber optic cable according to claim 1 wherein each of said pair of longitudinal strength members comprises a reinforced dielectric material.

6. A fiber optic cable according to claim 1 wherein said at least one buffer tube, said pair of strength members, and said jacket are plastic so that the fiber optic cable is an all-dielectric cable.

7. A fiber optic cable according to claim 1 further comprising an armor layer surrounding said core and underlying said jacket to provide additional protection for said core.

8. A fiber optic cable according to claim 1 wherein said jacket has a generally elliptical shape with an enlarged central lobe surrounding said core, and a pair of relatively smaller lobes on opposite sides of said central lobe and surrounding respective longitudinal strength members to thereby define a trilobal shape for said jacket.

9. A fiber optic cable according to claim 1 wherein said at least one buffer tube is a single buffer tube.

10. A fiber optic cable according to claim 1 wherein said core further comprises a central support member, and wherein said at least one buffer tube comprises a plurality of buffer tubes surrounding said central support member.

11. A fiber optic cable comprising:
    a core comprising at least one elongate buffer tube and at least one optical fiber disposed within said at least one buffer tube;
    a pair of longitudinal strength members extending along respective opposite sides of said core, said strength members having a predetermined tensile strength and being adapted for supporting said fiber optic cable between adjacent vertical supports in a self-supporting aerial configuration;

a jacket surrounding said core and said strength members, said jacket having a generally elliptical outer cross-sectional shape with a major transverse axis thereof generally aligned with an imaginary line defined between said pair of longitudinal strength members;

an armor layer surrounding said core and underlying said jacket to provide additional protection for said core; and wherein said fiber optic cable is flexible to facilitate twisting thereof between adjacent vertical supports to define a more irregular shape for wind passing over said fiber optic cable to thereby reduce wind-induced motion thereof.

12. A fiber optic cable according to claim 11 wherein each of said pair of strength members is a steel wire having a circular cross-section shape with a diameter in a range of about 1.7 to 3 mm.

13. A fiber optic cable according to claim 11 wherein each of said pair of strength members is a stranded metallic wire.

14. A fiber optic cable according to claim 11 wherein each of said pair of longitudinal strength members comprises a reinforced dielectric material.

15. A fiber optic cable according to claim 11 wherein said jacket has a generally elliptical shape with an enlarged central lobe surrounding said core, and a pair of relatively smaller lobes on opposite sides of said central lobe and surrounding respective longitudinal strength members to thereby define a trilobal shape for said jacket.

16. A fiber optic cable adapted to be aerially installed in a self-supporting configuration extending generally horizontally along a series of spaced apart vertical supports, said fiber optic cable comprising:

a core comprising at least one elongate buffer tube and at least one optical fiber disposed within said at least one buffer tube;

a pair of longitudinal strength members extending along respective opposite sides of said core, said pair of strength members having a predetermined tensile strength for supporting said fiber optic cable between adjacent vertical supports; and a plastic jacket surrounding said core and said strength members, said plastic jacket having a trilobal outer cross-sectional shape with an enlarged central lobe surrounding said core and a pair of relatively smaller lobes surrounding respective longitudinal strength members, the trilobal shape of said jacket defining a major transverse axis generally aligned with an imaginary line defined between said pair of longitudinal strength members.

17. A fiber optic cable according to claim 16 wherein each of said pair of longitudinal strength members comprises a solid steel wire having a circular cross-section shape with a diameter in a range of about 1.7 to 3 mm.

18. A fiber optic cable according to claim 16 wherein said at least one buffer tube is a single centrally positioned buffer tube.

19. A fiber optic cable according to claim 16 wherein said core further comprises a central support member, and wherein said at least one buffer tube comprises a plurality of buffer tubes surrounding said central support member.

20. A fiber optic cable according to claim 16 wherein said cable core, said strength members and said jacket are relatively flexible so as to facilitate rotational twisting of said fiber optic cable between adjacent vertical supports to define an irregular shape for wind passing thereover to thereby reduce wind-induced motion of said fiber optic cable.

21. A fiber optic communications system comprising:
a series of spaced apart vertical supports; and
a self-supporting fiber optic cable attached to each of said vertical supports and extending between adjacent vertical supports in a generally horizontal orientation, said self-supporting fiber optic cable comprising a core comprising at least one elongate buffer tube and at least one optical fiber disposed within said at least one buffer tube, a pair of longitudinal strength members extending along respective opposite sides of said core, said strength members having a predetermined tensile strength to support said fiber optic cable between adjacent vertical supports, a jacket surrounding said core and said strength members, said jacket having a generally elliptical outer cross-sectional shape with a major transverse axis thereof generally aligned with an imaginary line defined between said pair of longitudinal strength members, and wherein said fiber optic cable has a predetermined number of rotational twists between adjacent vertical supports to define an irregular shape for wind passing thereover to thereby reduce wind-induced motion of said self-supporting fiber optic cable.

22. A fiber optic cable communications system according to claim 21 further comprising an armor layer surrounding said core and underlying said jacket for further protecting said core, and wherein a portion of said fiber optic cable is installed below ground level.

23. A fiber optic cable communications system according to claim 21 wherein said fiber optic cable is twisted in a range of from 1 to 25 times for each 100 feet of horizontal span length.

24. A fiber optic cable communications system according to claim 21 wherein each of said pair of longitudinal strength members is a solid steel wire having a circular cross-section shape with a diameter in a range of about 1.7 to 3 mm.

25. A fiber optic cable communications system according to claim 21 wherein each of said pair of longitudinal strength members is a stranded metallic wire.

26. A fiber optic cable communications system according to claim 21 wherein each of said pair of longitudinal strength members comprises a reinforced dielectric material.

27. A fiber optic cable communications system according to claim 21 wherein said jacket has a generally elliptical shape with an enlarged central lobe surrounding said core, and a pair of relatively smaller lobes on opposite sides of said central lobe and surrounding respective longitudinal strength members to thereby define a trilobal shape for said jacket.

28. A fiber optic cable communications system according to claim 21 wherein said at least one buffer tube is a single centrally positioned buffer tube.

29. A fiber optic cable communications system according to claim 21 wherein said core further comprises a central support member, and wherein said at least one buffer tube comprises a plurality of buffer tubes surrounding said central support member.

30. An apparatus for making a self-supporting fiber optic cable adapted to be aerially installed in a self-supporting configuration extending generally horizontally between along a series of spaced apart vertical supports, said apparatus comprising:

feeder means for advancing a fiber optic cable core along a predetermined path, the fiber optic cable core comprising at least one elongate buffer tube and at least one optical fiber disposed within the at least one buffer tube;

means for positioning a pair of longitudinal strength members extending along respective opposite sides of the advancing fiber optic cable core; and extruder means along the predetermined path of travel for forming a plastic jacket surrounding the core and the strength members so that the plastic jacket has a generally elliptical outer cross-sectional shape with a major transverse axis thereof generally aligned with an imaginary line defined between the pair of longitudinal strength members, said extruder means comprising a generally elliptical die so that the jacket has a generally elliptical shape with an enlarged central lobe surrounding the core, and a pair of relatively smaller lobes on opposite sides of the central lobe and surrounding respective longitudinal strength members to thereby define a trilobal shape for the jacket.

31. An apparatus according to claim 30 wherein said extruder means includes a generally elliptical die.

32. An apparatus according to claim 30 further comprising cooling means positioned downstream from said extruder means for further cooling and solidifying the extruded plastic jacket.

33. An apparatus according to claim 30 further comprising armor applying means positioned upstream from said extruder means for forming an armor layer surrounding the fiber optic cable core.

34. A method for making a self-supporting fiber optic cable adapted to be aerially installed in a self-supporting configuration extending generally horizontally along a series of spaced apart vertical supports, said method comprising the steps of:

providing a core comprising at least one elongate buffer tube and at least one optical fiber disposed within the at least one buffer tube;

positioning a pair of longitudinal strength members extending along respective opposite sides of the core; and forming a plastic jacket surrounding the core and the strength members so that the plastic jacket has a generally elliptical outer cross-sectional shape with a major transverse axis thereof generally aligned with an imaginary line defined between the pair of longitudinal strength members, and wherein the step of forming the generally elliptical jacket comprises forming same to have an enlarged central lobe surrounding the core, and a pair of relatively smaller lobes on opposite sides of the central lobe and surrounding respective longitudinal strength members to thereby define a trilobal shape for the jacket.

35. A method according to claim 34 further comprising the step of forming an armor layer surrounding the fiber optic cable core and underlying the jacket.

36. A method for making a fiber optic communications system including a length of fiber optic cable aerially installed in a self-supporting configuration extending generally horizontally along a series of spaced apart vertical supports; the fiber optic cable of a type including a core comprising at least one elongate buffer tube and at least one optical fiber disposed within the at least one buffer tube, a pair of longitudinal strength members extending along respective opposite sides of the core, the strength members having a predetermined tensile strength to support the fiber optic cable between adjacent vertical supports, and a jacket the core and the strength members, the jacket having a generally elliptical outer cross-sectional shape with a major transverse axis thereof generally aligned with an imaginary line defined between the pair of longitudinal strength members; said method comprising the steps of:

advancing the generally elliptically-shaped self-supporting fiber optic cable through a series of clamps carried by respective vertical supports;

twisting the generally elliptically-shaped self-supporting fiber optic cable between adjacent vertical supports to define a more irregular shape for wind passing over the fiber optic cable to thereby reduce wind-induced motion thereof; and securing the clamps to maintain the twists in the cable.

37. A method according to claim 36 wherein the fiber optic cable also includes an armor layer surrounding the core and underlying the jacket, and further comprising the step of positioning a length of the fiber optic cable below ground level.

* * * * *

UNITED STATES PATENT AND TRADEMARK OFFICE
CERTIFICATE OF CORRECTION

PATENT NO. : 5,448,670
DATED : September 5, 1995
INVENTOR(S) : Douglas J. Blew, Bruce J. Carlson, John C. Chamberlain, Jana Horska It is certified that error appears in the above-indentified patent and that said Letters Patent is hereby corrected as shown below:

On the Title page, References, U.S. Patents, "Engnér" should be -- Egnér --.

Column 1, line 45, before "Arroyo" insert -- to --.

Column 3, line 14, "aerial-self" should be -- aerial self --.

Column 6, line 2, "embodiment" should be -- embodiments --.

Column 12, line 14, after "comprising" insert a colon (:).

Column 13, line 6, omit "along".

Column 14, line 31, after "jacket" insert -- surrounding --.

Signed and Sealed this

Twenty-third Day of April, 1996

Attest:

BRUCE LEHMAN

*Attesting Officer*  *Commissioner of Patents and Trademarks*